US011741836B2

(12) United States Patent
Higuchi et al.

(10) Patent No.: US 11,741,836 B2
(45) Date of Patent: Aug. 29, 2023

(54) METHODS AND SYSTEMS FOR PERFORMING CORRELATION-BASED PARKING AVAILABILITY ESTIMATION

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 114 days.

(21) Appl. No.: 17/169,144

(22) Filed: Feb. 5, 2021

(65) Prior Publication Data
US 2022/0139224 A1 May 5, 2022

Related U.S. Application Data

(60) Provisional application No. 63/107,158, filed on Oct. 29, 2020.

(51) Int. Cl.
*G08G 1/14* (2006.01)
*G06F 17/18* (2006.01)
*G06N 7/00* (2023.01)

(52) U.S. Cl.
CPC ............. *G08G 1/145* (2013.01); *G06F 17/18* (2013.01); *G06N 7/00* (2013.01); *G08G 1/141* (2013.01)

(58) Field of Classification Search
CPC ........ G08G 1/145; G08G 1/141; G06F 17/18; G06N 7/00
See application file for complete search history.

(56) References Cited

U.S. PATENT DOCUMENTS 8,484,151 B1 * 7/2013 Lookingbill ........... G08G 1/147
706/46
9,576,250 B2 2/2017 de Souza et al.
(Continued)

FOREIGN PATENT DOCUMENTS

CN 101193459 A 6/2008
CN 102030008 A 4/2011
(Continued)

OTHER PUBLICATIONS

Tekouabou et al., "Improving Parking Availability Prediction in Smart Cities with IoT and Ensemble-based Model", 11 pages, https://www.sciencedirect.com/science/article/pii/S1319157819312613#bb0175.
(Continued)

*Primary Examiner* — Mohamed Barakat
(74) *Attorney, Agent, or Firm* — DINSMORE & SHOHL LLP (57) ABSTRACT

A method for performing correlation-based parking availability estimation is provided. The method includes retrieving a plurality of parking availability correlation models, wherein each of the parking availability correlation models estimates parking availability for a target parking block based on parking availability for one or more other parking blocks; selecting a subset of the parking availability correlation models, wherein the subset comprises parking availability correlation models that estimate parking availability of the target parking block based on parking availability for one or more other parking blocks for which current parking availability is known; selecting a parking availability correlation model from the subset based on a model quality indicator associated with each parking availability correlation model; and estimating parking availability for the target
(Continued)

parking block based on the selected parking availability correlation model.

20 Claims, 6 Drawing Sheets (56) References Cited

U.S. PATENT DOCUMENTS

| | | | |
|---|---|---|---|
| 9,671,237 B1* | 6/2017 | Eliassi | G08G 1/144 |
| 9,704,401 B2 | 7/2017 | Akavaram et al. | |
| 9,959,761 B2 | 5/2018 | Tsyrklevich | |
| 10,095,228 B1* | 10/2018 | Kuffner, Jr. | G05D 1/0088 |
| 10,290,073 B2 | 5/2019 | Amir | |
| 2008/0130922 A1 | 6/2008 | Shibata et al. | |
| 2011/0083075 A1 | 4/2011 | MacNeille et al. | |
| 2011/0133957 A1 | 6/2011 | Harbach et al. | |
| 2014/0058711 A1* | 2/2014 | Scofield | G08G 1/143 703/6 |
| 2016/0117925 A1 | 4/2016 | Akavaram et al. | |
| 2016/0188953 A1* | 6/2016 | Tabb | G06T 7/70 382/103 |
| 2018/0301031 A1 | 10/2018 | Naamani et al. | |
| 2018/0313660 A1 | 11/2018 | Eyster et al. | |
| 2019/0094038 A1 | 3/2019 | Oh et al. | |
| 2019/0163826 A1* | 5/2019 | Arquero | G06N 20/00 |
| 2019/0251973 A1 | 8/2019 | Kume | |
| 2019/0371175 A1* | 12/2019 | Joos | G08G 1/144 |
| 2020/0043328 A1* | 2/2020 | Reisbick | G01R 33/02 |
| 2021/0233405 A1* | 7/2021 | Zhang | G06N 3/0445 |

FOREIGN PATENT DOCUMENTS

| | | |
|---|---|---|
| JP | 2002199499 A | 7/2002 |
| JP | 2005190192 A | 7/2005 |
| JP | 2006284454 A | 10/2006 |
| JP | 2008001247 A | 1/2008 |

OTHER PUBLICATIONS

Tooraj Tajabioun and Petros A. Ionannou, "On-Street and Off-Street Parking Availability Prediction Using Multivariate Spatiotemporal Models," IEEE Transactions on Intelligent Transportaion Systems, vol. 16, No. 5, 12 pages.

* cited by examiner

METHODS AND SYSTEMS FOR PERFORMING CORRELATION-BASED PARKING AVAILABILITY ESTIMATION

TECHNICAL FIELD

This application claims priority to U.S. Provisional Application No. 63/107,158, filed on Oct. 29, 2020, the entire contents of which is hereby incorporated by reference.

TECHNICAL FIELD

The present specification relates to identifying available parking spaces, and more particularly, to methods and systems for performing correlation-based parking availability estimation.

BACKGROUND

Wasted time while searching for a parking space has been a societal issue for decades. One method of identifying available parking is receiving data from on-board sensors of connected vehicles to monitor live availability of parking. However, such monitoring of live parking availability can only be performed when a connected vehicle passes by a parking space of interest. Thus, parking spaces in less popular parking areas may have less vehicle traffic, and thus, less fewer opportunities to update their live parking availability. As such, certain parking areas may not be sufficiently updated with live parking availability. Accordingly, a need exists for methods and systems for identifying parking availability in un-monitored parking blocks based on known parking availability in monitored parking blocks.

SUMMARY

In one embodiment, a method may include retrieving a plurality of parking availability correlation models, wherein each of the parking availability correlation models estimates parking availability for a target parking block based on parking availability for one or more other parking blocks, selecting a subset of the parking availability correlation models, wherein the subset comprises parking availability correlation models that estimate parking availability of the target parking block based on parking availability for one or more other parking blocks for which current parking availability is known, selecting a parking availability correlation model from the subset based on a model quality indicator associated with each parking availability correlation model, and estimating parking availability for the target parking block based on the selected parking availability correlation model.

In another embodiment, a server may include a controller configured to retrieve a plurality of parking availability correlation models, wherein each of the parking availability correlation models estimates parking availability for a target parking block based on parking availability for one or more other parking blocks, select a subset of the parking availability correlation models, wherein the subset comprises parking availability correlation models that estimate parking availability of the target parking block based on parking availability for one or more other parking blocks for which current parking availability is known, select a parking availability correlation model from the subset based on a model quality indicator associated with each parking availability correlation model, and estimate parking availability for the target parking block based on the selected parking availability correlation model.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for performing correlation-based parking availability estimation. When a driver of a vehicle needs to park the vehicle using public parking, the driver may request parking assistance from a server. In particular, a driver may request parking availability information for one or more parking blocks in the vicinity of a selected destination. The server may receive sensor data from one or more connected vehicles located in certain parking blocks and may determine parking availability in one or more parking blocks based on the received sensor data.

However, the server may only be able to determine parking availability for parking blocks for which sufficient data (e.g., sensor data from connected vehicles) is available. For parking blocks for which insufficient data is available, the server may not be able to directly determine parking availability data. However, there may exist correlations between parking availability in certain parking blocks and parking availability in other parking blocks. As such, the server may determine a plurality parking availability correlation models that are able to estimate parking availability in one parking block based on known parking availability in one or more other parking blocks. The server may train the correlation models based on known historical parking availability data. The server may train multiple correlation models, wherein each correlation model may estimate parking availability for a different parking block and/or based on known parking availability of different parking blocks.

Once a plurality of parking availability correlation models are trained, when the server receives a request to determine parking availability for a particular parking block, the server may determine known parking availability for certain blocks (e.g., based on sensor data received from connected vehicles) and may then select a parking availability correlation model. In particular, the server may select a parking availability correlation model that has been trained to estimate parking availability for the parking block of interest based on the known parking availability data. The server may then use the selected parking availability correlation model to estimate parking availability in the parking block of interest and may transmit this information to the connected vehicle that requested parking assistance.

Figure 1:
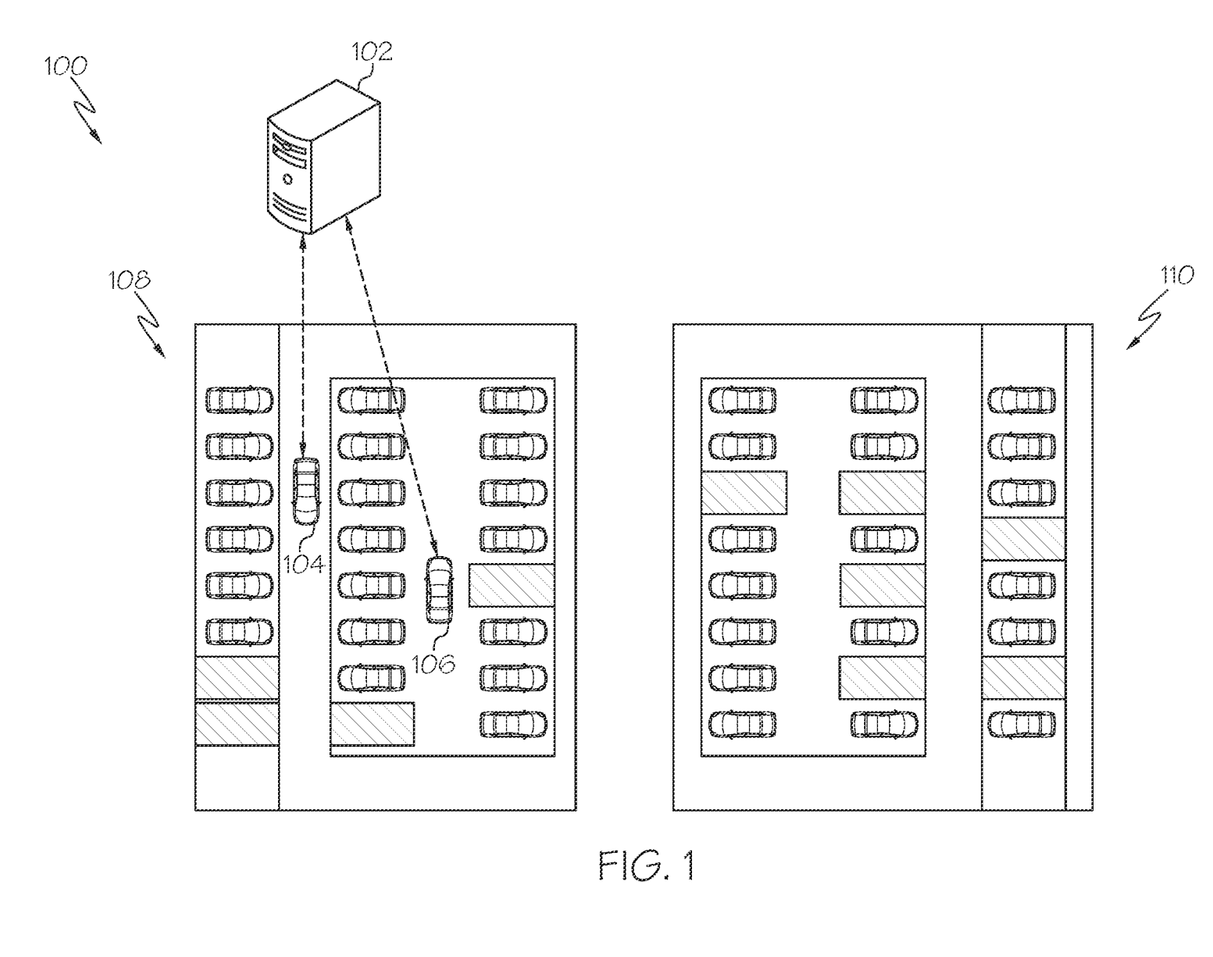
FIG. 1 schematically depicts a system for performing correlation-based parking availability estimation, according to one or more embodiments shown and described herein.

Turning now to the figures, FIG. 1 schematically depicts a parking assistance system 100 for performing correlation-based parking availability estimation. The system 100 includes a server 102 and one or more connected vehicles 104, 106. In the example of FIG. 1, the system 100 includes two connected vehicles. However, in other examples, it should be understood that the system 100 may include any number of connected vehicles. The connected vehicles 104, 106 may be communicatively coupled to the server 102, as disclosed herein. Each of the connected vehicles 104, 106 may be an automobile or any other passenger or non-passenger vehicle such as, for example, a terrestrial, aquatic, and/or airborne vehicle including, but not limited to, a bus, a scooter, a drone, and a bicycle. In some embodiments, one or more of the connected vehicles 104, 106 may be an autonomous vehicle that navigates its environment with limited human input or without human input.

In the example of FIG. 1, connected vehicles 104, 106 are positioned in parking block 108. Meanwhile, no connected vehicles are located in adjacent parking block 110. The parking blocks 108, 110 may be different parking lots or sections of a parking near one or more facilities (e.g., a mall). Each of the parking blocks 108, 110 may comprise a plurality of parking spaces and each parking space may be either occupied or unoccupied by a parked vehicle. In the example of FIG. 1, two parking blocks are shown. However, in other examples, it should be understood that the system 100 may include any number of parking blocks comprising any number of parking spaces.

Because connected vehicles 104, 106 are positioned in parking block 108, the connected vehicles 104, 106 may gather and transmit sensor data to the server 102 that the server 102 may use to determine parking availability in parking block 108 (e.g., the number of available parking spaces in parking block 108 or a percentage of available parking spaces in parking block 108). However, because there are no connected vehicles located in parking block 110, in the example of FIG. 1, the server 102 may be unable to directly measure the parking availability in parking block 110. As such, the server 102 may rely on one or more parking availability correlation models to determine parking availability in parking block 110, as described herein.

Figure 2:
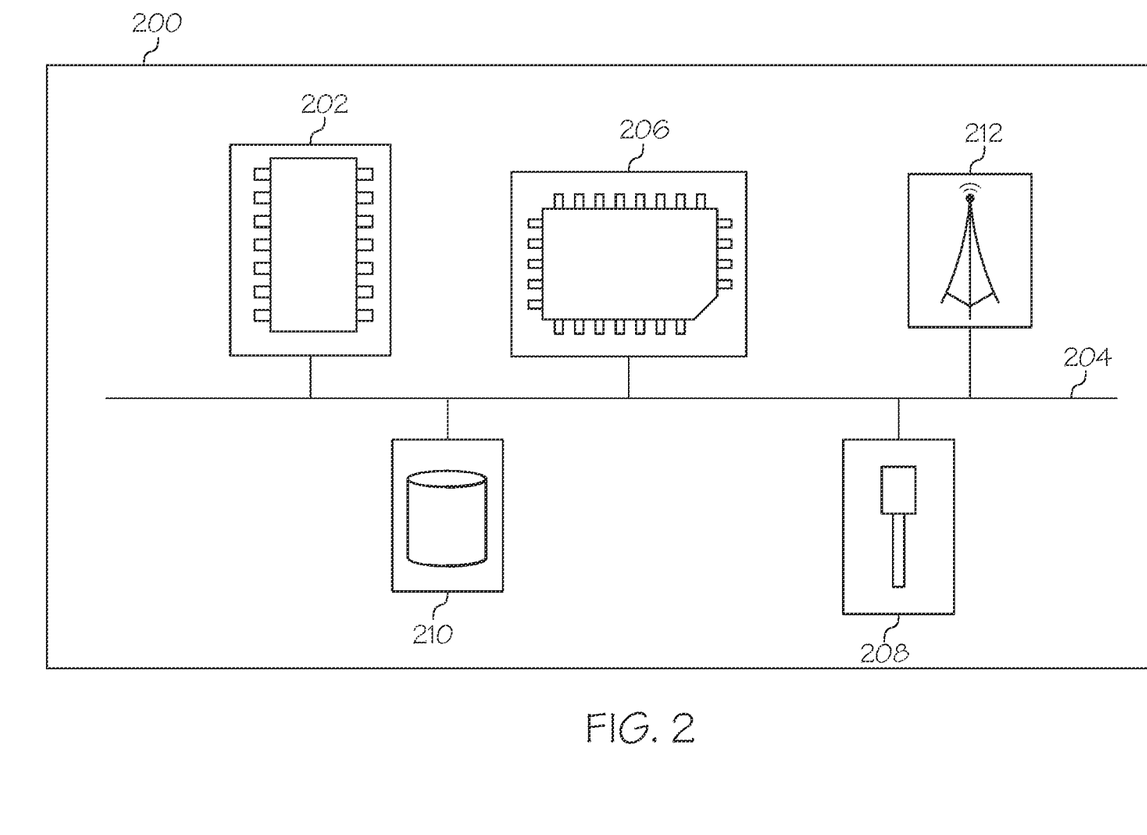
FIG. 2 depicts a schematic diagram of a vehicle system, according to one or more embodiments shown and described herein.

FIG. 2 depicts a vehicle system 200 included in the vehicles 104, 106 of FIG. 1. The vehicle system 200 includes one or more processors 202, a communication path 204, one or more memory modules 206, a satellite antenna 208, one or more vehicle sensors 210, and network interface hardware 212, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the location of vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more sensors 210 may include, but are not limited to, LiDAR sensors, RADAR sensors, optical sensors (e.g., cameras, laser sensors, proximity sensors, location sensors (e.g., GPS modules)), and the like. In embodiments, the sensors 210 may monitor the surroundings of the vehicle and may detect available parking spaces. In some examples, the vehicle system 200 may include a feature extraction module (not shown), which may extract features from images captured by a vehicle sensor 210 (e.g., a camera) to detect available parking spaces.

Still referring to FIG. 2, the vehicle system 200 comprises network interface hardware 212 for communicatively coupling the vehicle system 200 to the server 102 and/or another vehicle system. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit sensor data gathered by the sensors 210 to the server 102. The network interface hardware 212 may also transmit a request for parking assistance to the server 102. The network interface hardware 212 may also receive, from the server 102, information about parking availability in response to a parking assistance request.

The vehicle system 200 may also include an interface (not shown). The interface may allow for data to be presented to a driver and for data to be received from the driver. For example, the interface may include a screen to display information to a driver, speakers to present audio information to the driver, and a touch screen that may be used by the driver to input information. In other examples, the vehicle system 200 may include other types of interfaces. An interface of the vehicle system 200 may be used by the driver to request parking assistance from the server 102. In some examples, a screen may display parking availability information received from the server 102.

In some embodiments, the vehicle system 200 may be communicatively coupled to the server 102 by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, Zig-Bee, and/or other near field communication protocols. Suitable cellular networks include, but are not limited to, technologies such as LTE, WiMAX, UMTS, CDMA, and GSM.

Figure 3:
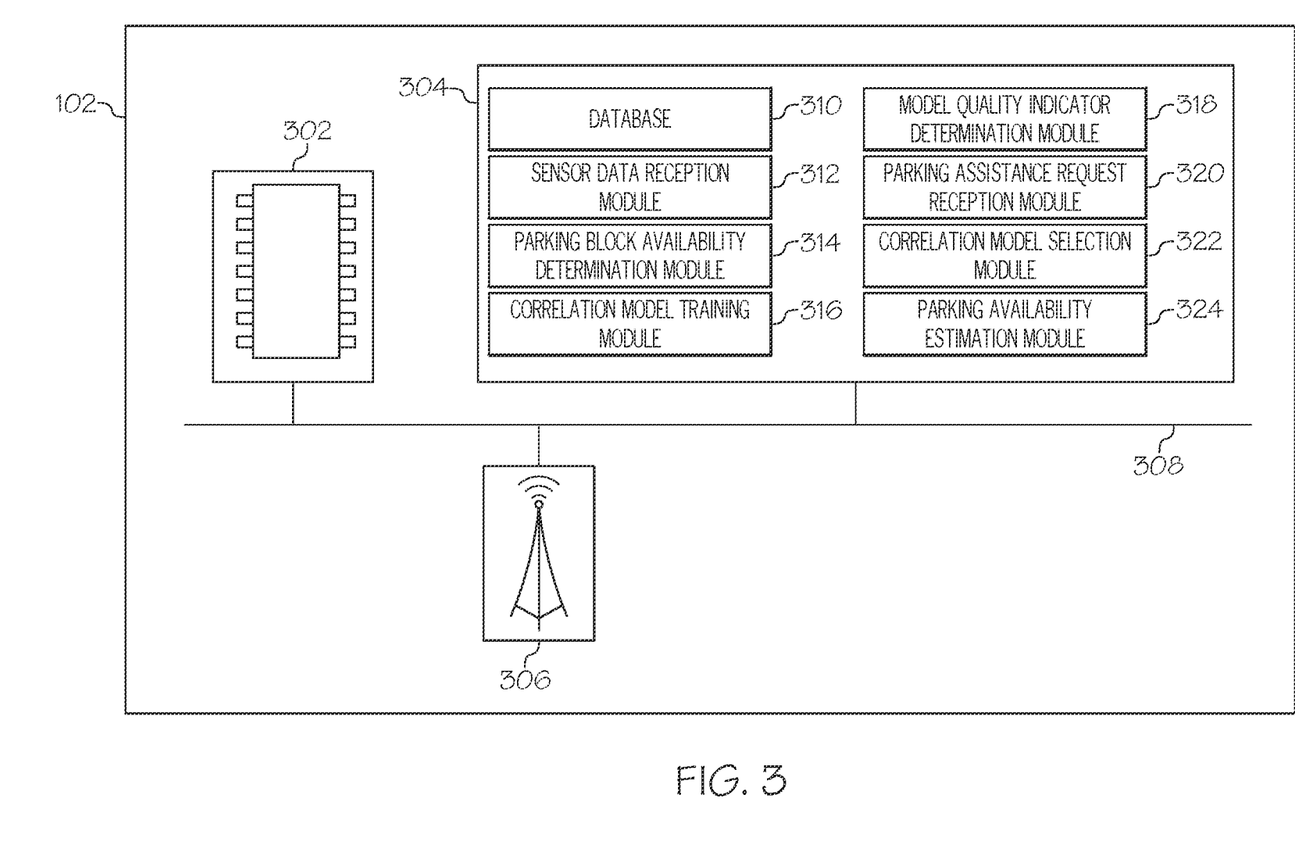
FIG. 3 depicts a schematic diagram of a server that may be part of the system of FIG. 1, according to one or more embodiments shown and described herein.

Now referring to FIG. 3, a schematic diagram of the server 102 is shown. In some examples, the server 102 may be positioned near one or more parking facilities (e.g., an edge server). In other examples, the server 102 may be a cloud server. In other examples, the server 102 may comprise any other suitable computing system.

In the example of FIG. 3, the server 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the server 102 may transmit and receive data to and from connected vehicles (e.g., vehicles 104, 106 of FIG. 1).

The one or more memory modules 304 include a database 310, a sensor data reception module 312, a parking block availability determination module 314, a correlation model training module 316, a model quality indicator determination module 318, a parking assistance request reception module 320, a correlation model selection module 322, and a parking availability estimation module 324. Each of the database 310, the sensor data reception module 312, the parking block availability determination module 314, the correlation model training module 316, the model quality indicator determination module 318, the parking assistance request reception module 320, the correlation model selection module 322, and the parking availability estimation module 324 may be a program module in the form of operating systems, application program modules, and other program modules stored in one or more memory modules 304. In some embodiments, the program module may be stored in a remote storage device that may communicate with the server 102. In some embodiments, one or more of the database 310, the sensor data reception module 312, the parking block availability determination module 314, the correlation model training module 316, the model quality indicator determination module 318, the parking assistance request reception module 320, the correlation model selection module 322, and the parking availability estimation module 324 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 310 may temporarily and/or permanently store a variety of data used by the memory modules 304 and/or other components of the server 102. In particular, the database 310 may store sensor data received from connected vehicles, historical parking availability data for a plurality of parking blocks, and parameters of correlation models, among other things. The data stored in the database 310 is discussed in further detail below.

The sensor data reception module 312 may receive sensor data from one or more connected vehicles (e.g., vehicles 104, 106 of FIG. 1). The sensor data received by the sensor data reception module 312 may comprise sensor data captured by the sensors 210 of one of more vehicle systems 200 of connected vehicles. In embodiments, the sensor data reception module 312 may receive images and/or features extracted from images captured by the sensors 210 of one or more vehicle systems 200 of connected vehicles. The sensor data reception module 312 may also receive locations of each of the connected vehicles that transmit sensor data. The sensor data and vehicle locations received by the sensor data reception module 312 may be used by the server 102 to identify available parking spaces, as described in further detail below.

The parking block availability determination module 314 may determine live parking availability in one or more parking blocks. In embodiments, the parking block availability determination module 314 may determine live parking availability based on sensor data and vehicle locations received by the sensor data reception module 312. For example, the sensor data reception module 312 may receive images captured by connected vehicles and the parking block availability determination module 314 may determine available parking spaces based on the received images (e.g., by utilizing image processing techniques). In the example of FIG. 1, as the vehicles 104, 106 drive around parking block 108, vehicle sensors may capture various images of the parking block 108. The images may be transmitted to the server 102 along with the locations of the vehicles when the images are captured. The sensor data and location data may be received by the sensor data reception module 312 and the parking block availability determination module 314 may then identify available parking spaces within the parking block 108.

By receiving sensor data from a plurality of connected vehicles in a plurality of parking blocks, the parking block availability determination module 314 may determine live parking availability for a plurality of parking blocks. In some examples, the parking block availability determination module 314 may access a map of a parking block (e.g., a map that includes positions of individual parking spaces within the parking block). The parking block availability determination module 314 may then use map matching techniques to associate each detected parking space with a parking space on the map of the parking block. In some examples, the parking block availability determination module 314 may determine a number of available parking spaces in a parking block. In other examples, the parking block availability determination module 314 may determine a percentage of parking spaces in a parking block that are available. After determining parking availability for a parking block, the parking block availability determination module 314 may store the parking availability data in the database 310.

Referring back to FIG. 3, the correlation model training module 316 may train a plurality of correlation models to estimate parking availability. Each correlation model may estimate parking availability in a particular parking block based on known parking availability in one or more other parking blocks.

As discussed above, there may be situations in which the server 102 is able to determine parking availability in certain parking blocks (e.g., certain portions of a parking facility) based on sensor data received from connected vehicles, but is unable to directly determine parking availability in other parking blocks (e.g., due to a lack of sensor data from connected vehicles in those parking blocks). However, correlations may exist between parking availability in certain blocks and parking availability in other parking blocks. For example, parking availability in a parking block close to a mall may be correlated to parking availability in a parking block somewhat further from the mall. Therefore, if parking availability is known for certain parking blocks, the server 102 may be able to use this information to determine parking availability for other parking blocks, using the techniques described herein.

As discussed above, the parking block availability determination module 314 may determine live parking availability for a parking based on sensor data received by the sensor data reception module 312 (e.g., from connected vehicles positioned in the parking block). When the parking block availability determination module 314 determines parking availability for a particular parking block, the parking availability may be stored in the database 310 along with the date and time of the parking availability. As such, over time, the database 310 may build up a history of parking availability for a plurality of different parking blocks. The correlation model training module 316 may then use the parking history stored in the database 310 to train correlation models, as described herein.

By training multiple correlation models, the server 102 may be more flexible in estimating parking availability for parking blocks without a live parking availability determination. For example, consider a parking facility comprising four parking blocks A, B, C and D. Multiple correlation models may be used to estimate the parking availability of parking block D, depending on which of parking blocks A, B and C have known parking availability. In particular, known parking availability from any combination of parking blocks A, B and C may be part of a correlation model. For example, a first correlation model may estimate parking availability in block D if the only known parking availability is from block A, a second correlation model may estimate parking availability in block D if the only known parking availability is from block B, and a third correlation model may estimate parking availability in block D if the only known parking availability is from block C. Additional correlation models may estimate parking availability in block D if parking availability is known for any two of parking blocks A, B and C (e.g., A and B, A and C, or B and C). Lastly, another correlation model may estimate parking availability in block D if parking availability is known for parking blocks A, B and C. Similar correlation models may exist for estimating the parking availability in parking blocks A, B and C.

By training a plurality of correlation models, the server 102 may select a model that best suits the known parking availability data. For instance, in the example discussed above, if parking availability is known for parking blocks A and C, a correlation model that takes parking availability for blocks A and C as input may be used. Alternatively, if parking availability is known only for parking block A, a different correlation model that takes parking availability only for block A as input may be used.

The correlation model training module 316 may train a plurality of parking availability correlation models using historical parking availability data stored in the database 310. In some examples, the correlation model training module 316 trains correlation models using a linear regression model. For example, assume that there are n parking blocks. The system 100 may model the parking availability of the i-th parking block as a linear combination of the parking availability of the other n−1 parking blocks, as shown in the equation below.

$$x_i = w_1 \times x_1 + w_2 \times x_2 + \ldots + w_{i-1} \times x_{i-1} + w_{i+1} \times x_{i+1} + w_n \times x_n$$

where $x_j$ is the known parking availability of the j-th parking block and $w_j$ is a parameter of the model. The correlation model training module 316 may train the linear regression model to best fit the known historical parking availability data. For example, the correlation model training module 316 may use machine learning or other techniques to learn the parameters $w_j$ of the linear regression model such that a loss function (e.g., root mean square error) is minimized when using the parking history data as training data. After the parameters of a correlation model are learned, they may be stored in the database 310.

Using the above equation requires parking availability to be known for all n parking blocks other than the i-th parking block. As explained above, this data may not always be available. As such, the correlation model training module 316 may train a plurality of correlation models using different combination of parking block availability as inputs. For example, another regression model may use only parking availability data from block 1, as shown in the equation below.

$$x_i = w_1' \times x_1$$

While this model may not be as accurate as the model that uses parking availability data from all n parking blocks, it may still perform a parking availability estimate of block i when only parking availability data from block 1 is known. In some examples, the correlation model training module 316 may only train correlation models using parking availability data from popular parking blocks as input parameters of regression models since parking availability from popular parking blocks is more likely to be known.

Referring still to FIG. 3, the model quality indicator determination module 318 may determine a model quality indicator for each correlation model trained by the correlation model training module 316. A model quality indicator for a correlation model may indicate how accurate the correlation model is expected to be when estimating parking availability of a parking block. As explained above, the correlation model training module 316 may train a correlation model to minimize a loss function, such as root mean square error. Thus, after a correlation model is trained, the model quality indicator determination module 318 may determine the root mean square error across the training data and may store the root mean square error (or a normalized value proportional to the root mean square error) as the model quality indicator.

The model quality indicator determination model may determine a model quality indicator for each correlation model trained by the correlation model training module 316. Accordingly, when multiple correlation models may be used to estimate parking availability for an unknown parking block (e.g., based on the amount of known parking availability data that is available), the model having the highest model quality indicator may be used, as discussed in further detail below. For example, in the two equations discussed above, the model that uses parking availability data from n−1 parking blocks as inputs may be more accurate, and may consequently have a higher model quality indicator, than the model that only uses parking availability data from a single parking block.

Referring still to FIG. 3, the parking assistance request reception module 320 may receive a request for parking assistance from a connected vehicle. In some examples, a request for parking assistance may comprise a request to determine parking availability in a particular parking block. In other examples, a request for parking assistance may comprise a request for parking availability in a particular geographic area (e.g., close to a specified destination). In these examples, the parking assistance request reception module 320 may identify one or more parking blocks in the geographic area (e.g., based on map data). After the parking assistance request reception module 320 receives a request for parking information, the server 102 may determine parking availability in one or more parking blocks based on the request.

The correlation model selection module 322 may select a particular correlation model to be used to determine parking availability for one or more parking blocks (e.g., parking blocks determined by the parking assistance request reception module 320, as discussed above). If parking availability is to be determined for multiple parking blocks, the correlation model selection module 322 may select a different model to determine the availability of each block.

When determining a correlation model to use to determine parking availability for a particular block, the correlation model selection module 322 first determines which parking blocks have known parking availability. This may be determined based on sensor data received by the sensor data reception module 312. In particular, the correlation model selection module 322 may determine which blocks have known parking availability based on recently received sensor data (e.g., sensor data received within a predetermined threshold period of time). If the parking block availability determination module 314 has determined parking availability for a particular parking block based on recently received sensor data, it may be presumed that the determined parking availability is still reasonably accurate. However, if the parking block availability determination module 314 has determined parking availability based on sensor data received a significant time in the past, it may be presumed that this parking availability data is no longer accurate. As such, only parking availability data determined based on recently received sensor data, which is presumed to be relatively accurate, may be used to estimate parking availability for unknown parking blocks.

After the correlation model selection module 322 determines which parking blocks have known parking availability, the correlation model selection module 322 may determine which correlation models have inputs comprising of known parking availability. That is, the correlation model selection module 322 may filter out correlation models that require inputs comprising parking availability data that is not known. For example, among four parking blocks A, B, C and D, if parking availability is desired to be estimated for parking block D and parking availability is known for parking blocks A and B but is not known for parking block C, the correlation model selection module 322 may filter out any correlation models that require parking availability for parking block C.

After the correlation model selection module 322 filters out correlation models requiring parking availability data that is unknown, if a single correlation model remains, the correlation model selection module 322 may select that correlation model to use to estimate parking availability data for the desired parking block. Alternatively, if multiple correlation models remain, the correlation model selection module 322 may select the correlation model having the highest model quality indicator, as determined by the model quality indicator determination module 318. If no correlation models remain, based on the parking availability data that is known, the correlation model selection module 322 may select a default parking availability estimation model. The default parking availability estimation model may estimate parking availability for a parking block without taking correlations with other parking blocks into account. For example, the default parking availability estimation model may estimate parking availability for a parking block based on a number of parking spaces within the block, a distance from the parking block to nearby points of interest, a type of parking facility in which the block is located (e.g., retail parking) and typical parking availability for that type of facility, or the time of day or day of the week. In some examples, other factors other than correlations with other parking blocks may be used by the default parking availability estimation model.

Referring still to FIG. 3, the parking availability estimation module 324 may estimate parking availability for a target parking block using the correlation model selected by the correlation model selection module 322. For example, for a linear regression model requiring parking availability of certain parking blocks as inputs, the parking availability estimation module 324 may input the required parking availability data and compute the estimated parking availability for the target parking block using the parameters from the pre-trained model. The network interface hardware 306 may then transmit the estimated parking availability data for the target parking block to the requesting vehicle.

Figure 4:
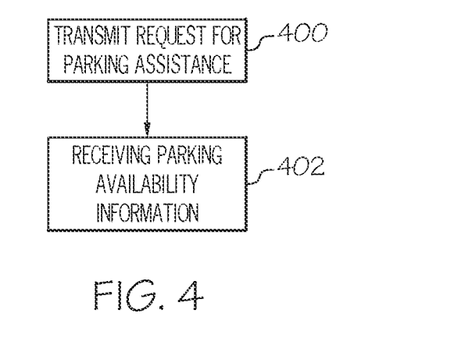
FIG. 4 depicts a flowchart for operating a vehicle that may be part of the system of FIG. 1, according to one or more embodiments shown and described herein.

FIG. 4 depicts a flowchart for performing correlation-based parking availability estimation that may be performed by the vehicle system 200 in FIG. 2 of a connected vehicle that desires parking assistance. The flowchart is described herein with reference to FIGS. 1-3. At step 400, the network interface hardware 212 may transmit a request for parking assistance to the server 102. In some examples, the request may include a desired destination specified by a user (e.g., input by the driver of the vehicle). In other examples, the request may include one or more parking blocks for which parking availability is desired.

At step 402, the network interface hardware 212 may receive information about parking availability of one or more parking blocks. The driver of the vehicle may then utilize the parking availability information to make parking decisions.

Figure 5:
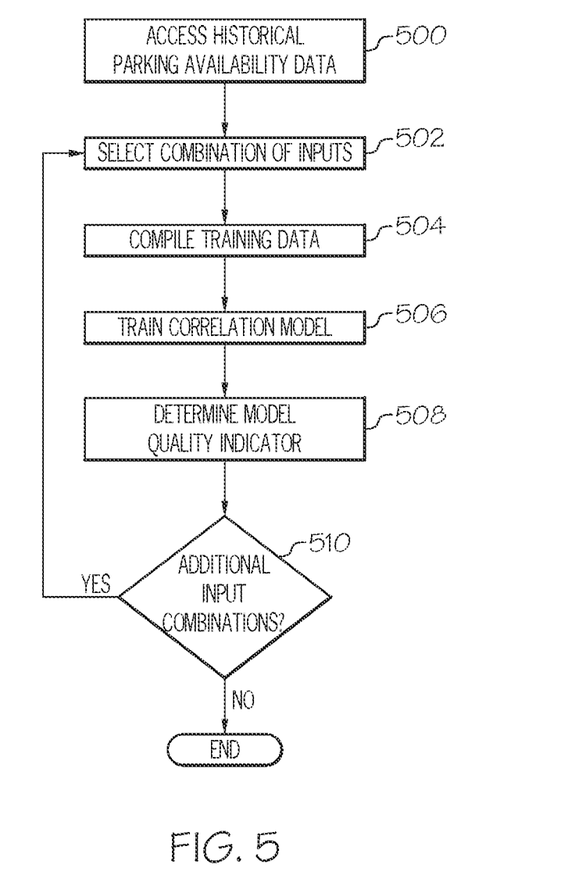
FIG. 5 depicts a flowchart for training correlation models to estimate parking availability for a target parking block.

FIG. 5 depicts a flowchart for training parking availability correlation models that may be performed by the server 102. The flowchart is described herein with reference to FIGS. 1-3. The flowchart of FIG. 5 depicts training one or more parking availability correlation models to estimate parking availability for a target parking block. The flowchart of FIG. 5 may be repeated to train one or more parking availability correlation models to estimate parking availability for any number of parking blocks.

At step 500, the correlation model training module 316 may access historical parking availability data for one or more parking blocks, including the target parking block. The historical parking availability data may comprise parking availability of one or more parking blocks at different times. The historical parking availability data may be stored in the database 310 based on vehicle sensor data previously received by the sensor data reception module 312.

At step 502, the correlation model training module 316 may select a combination of inputs to be used to train a particular correlation model. As discussed above, a plurality of input combinations of parking availability data of different parking blocks may be used to train different correlation models. For example, one correlation model may estimate parking availability of block D based on parking availability of block A, while another correlation model may estimate parking availability of block D based on parking availability of blocks A and B. Thus, at step 502, the correlation model training module 316 may select one combination of input parking availability data to be used to train one correlation model for estimating parking availability of the target parking block. The combination of input parking availability data may comprise parking availability data from any parking blocks about which historical parking availability data is known at the same time that historical parking availability data is known for the target parking block, for which parking availability is to be estimated.

At step 504, the correlation model training module 316 may compile the training data to be used to train a specific correlation model. For example, at step 502, the correlation model training module 316 may have selected parking blocks A and B to be used as inputs for a correlation model to estimate parking availability of block D. In this example, the correlation model training module 316 may compile all of the historical parking data for which parking availability is known for parking blocks A, B and D at the same time (or within a threshold time period of each other). Each point in time for which parking availability is known for parking blocks A, B and D may be used as one training example. By compiling training examples for which parking availability data is known for parking blocks A, B and D, a correlation model may be trained to learn the correlation between parking availability of blocks A and B and parking availability of block D. Then, once the model is trained, the model may be used to estimate parking availability of block D when parking availability is known for blocks A and B but is unknown for block D.

At step 506, the correlation model training module 316 may train the correlation model using the compiled training data. In some examples, the correlation model may be trained as a linear regression model. In these examples, parking availability for the target block may be estimated as a linear combination of the parking availabilities for each of the input parking blocks. The linear regression model may have model parameters comprising weights to be used for the linear combination. The correlation model training module 316 may determine a cost associated with each training example (e.g., a difference between the estimated parking availability for the target block and the actual parking availability of the target block using a particular set of model parameters). The correlation model training module 316 may then calculate a loss function by combining the cost for each of the training examples (e.g., a root mean square error). The correlation model training module 316 may then determine the model parameters to minimize the loss function (e.g., by using gradient descent or other known optimization methods). The correlation model training module 316 may then store the model parameters in the database 310.

At step 508, the model quality indicator determination module 318 may determine a model quality indicator for the correlation model that was trained by the correlation model training module 316. In embodiments, the model quality indicator may be based on the loss function for the trained correlation model using the training data. The model quality indicator determination module 318 may store the determined model quality indicator in the database 310.

At step 510, the correlation model training module 316 may determine whether there are additional combinations of input blocks to be used to train additional correlation models to estimate the parking availability of the target parking block. If there are additional combinations (yes at step 510), then control returns to step 502 and an additional combination of inputs is selected. If there are no additional combinations (no at step 510), then the example of FIG. 5 ends.

Figure 6:
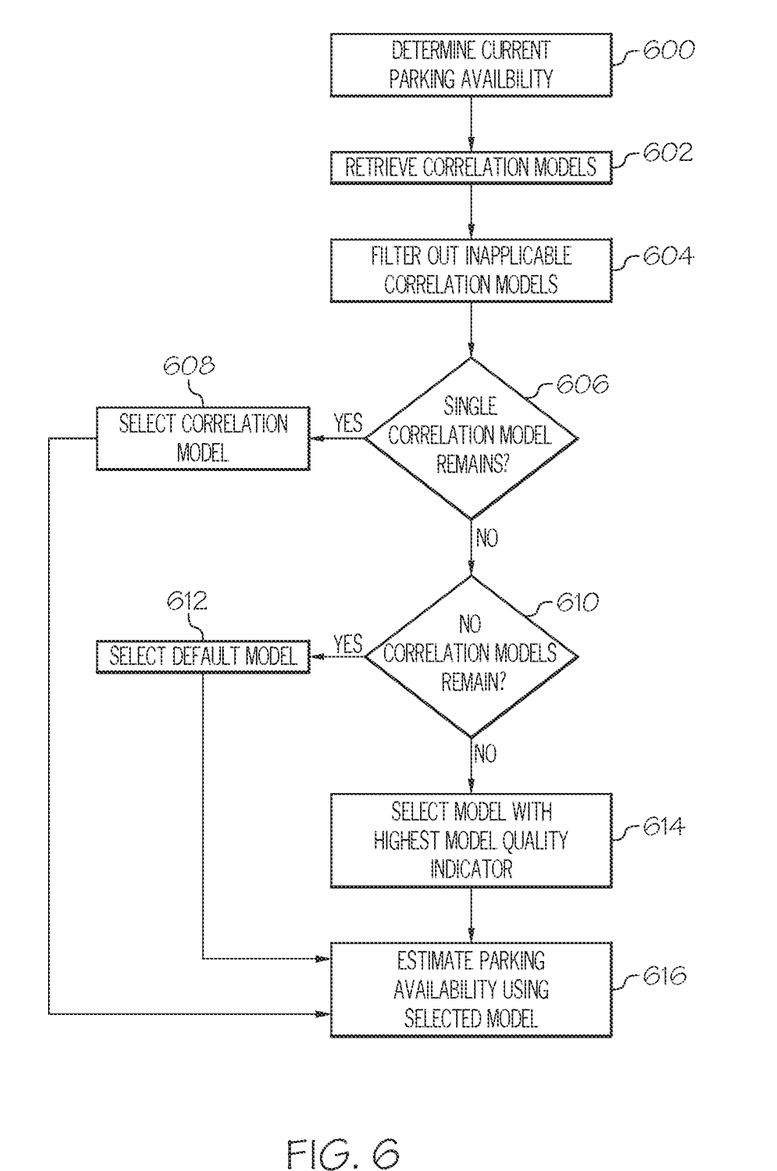
FIG. 6 depicts a flowchart for estimating parking availability for a target parking block, according to one or more embodiments shown and described herein.

FIG. 6 depicts a flowchart for performing correlation-based parking availability estimation that may be performed by the server 102. The flowchart is described herein with reference to FIGS. 1-3. The flowchart of FIG. 6 estimates parking availability for a target parking block for which parking availability cannot be directly measured. The target parking block may be specified in a request for parking assistance received by the parking assistance request reception module 320.

At step 600, the parking block availability determination module 314 may determine current parking availability of one or more parking blocks for which sensor data was recently received by the sensor data reception module 312. The parking block availability determination module 314 may determine current parking availability based on the received sensor data. The parking block availability determination module 314 may also determine which parking blocks do not have current parking availability data (e.g., parking blocks for which insufficient sensor data has been recently received).

At step 602, the correlation model selection module 322 may retrieve all of the pre-trained correlation models stored in the database 310 that may be used to estimate parking availability for the target parking block. Each such correlation model may use parking availability data from a different combination of parking blocks as input.

At step 604, the correlation model selection module 322 may filter out all of the retrieved correlation models that are inapplicable based on the currently known parking availability data. That is, the correlation model selection module 322 may filter out all of the correlation models which use, as an input, parking availability data from a parking block that is not currently known.

At step 606, the correlation model selection module 322 may determine whether a single correlation model remains that has not been filtered out. If a single model remains (yes at step 606), then the correlation model selection module 322 selects the remaining correlation model at step 608. If either multiple correlation models remain or if no correlation model remains (no at step 606), control passes to step 610.

At step 610, the correlation model selection module 322 determines whether no correlation models remain that have not been filtered out. If no correlation models remain (yes at step 610), then the correlation model selection module 322 selects a default parking availability estimation model at step 612. If multiple correlation models remain (no at step 610), then control passes to step 614.

At step 614, multiple correlation models may be used to estimate the parking availability of the target parking block. Therefore, the correlation model selection module 322 selects the remaining correlation model that has the highest model quality indicator. Then, at step 616 the parking availability estimation module 324 may input the appropriate parking availability data into the selected parking availability model and may estimate parking availability of the target parking block based on the output of the selected model.

It should now be understood that embodiments described herein are directed to methods and systems for performing correlation-based parking availability estimation. A connected vehicle may transmit a request for parking assistance to a server. The request may seek parking availability data related to one or more parking blocks.

After receiving the request, a server may determine current parking availability data for one or more parking blocks based on sensor data received from one or more connected vehicles. Then, for each parking block for which parking availability is desired, the server may select a parking availability correlation model to estimate parking availability. Each parking availability correlation model may be trained to estimate parking availability for a particular parking block based on known parking availability of one or more other parking blocks.

The server may select a parking availability correlation model based on which parking blocks have known parking availability. The server may then use the selected parking availability correlation model to estimate parking availability for the target block. The server may then transmit the estimated parking availability to the vehicle requesting the parking assistance.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
retrieving a plurality of parking availability correlation models, wherein each of the parking availability correlation models estimates parking availability for a target parking block comprising a plurality of parking spaces based on parking availability for one or more other parking blocks;
determining a first subset of the one or more other parking blocks for which current parking availability is known;
selecting a second subset of the parking availability correlation models, wherein the second subset comprises parking availability correlation models that estimate parking availability of the target parking block based on parking availability for one or more parking blocks of the first subset of the one or more other parking blocks for which current parking availability is known;
selecting a parking availability correlation model from the second subset based on a model quality indicator associated with each parking availability correlation model; and estimating parking availability for the target parking block based on the selected parking availability correlation model.

2. The method of claim 1, wherein each of the parking availability correlation models estimates parking availability for the target parking block based on parking availability for a different combination of other parking blocks.

3. The method of claim 1, wherein the parking availability for a parking block comprises a number of available parking spaces in the parking block.

4. The method of claim 1, wherein the parking availability for a parking block comprises a percentage of a total number of parking spaces in the parking block that are available.

5. The method of claim 1, further comprising:
determining the current parking availability for the one or more other parking blocks based on sensor data received from one or more connected vehicles located in the one or more other parking blocks.

6. The method of claim 1, further comprising:
determining that current parking availability for a parking block is known when sensor data has been received from one or more vehicles located in the parking block within a threshold time period.

7. The method of claim 1, wherein the model quality indicator associated with a parking availability correlation model comprises an indication as to how accurate the parking availability correlation model is likely to be.

8. The method of claim 1, wherein each of the parking availability correlation models comprises a linear regression model.

9. The method of claim 1, further comprising:
when the second subset of the parking availability correlation models comprises no parking availability correlation models, estimating the parking availability of the target parking block based on a default parking availability estimation model.

10. The method of claim 1, further comprising:
training each of the parking availability correlation models based on historical parking availability data of the one or more other parking blocks and the target parking block.

11. The method of claim 10, further comprising:
compiling training data comprising a plurality of training examples, wherein each training example comprises parking availability of the target parking block and parking availability of one or more other parking blocks at a certain time; and
training each of the parking availability correlation models using the training data.

12. The method of claim 11, further comprising:
training each of the parking availability correlation models as a linear regression model.

13. The method of claim 12, further comprising:
training each of the parking availability correlation models by selecting linear regression parameters such that a loss function is minimized, wherein the loss function is based on an error rate between the estimated parking availability for the target parking block and the actual parking availability for the target parking block.

14. The method of claim 13, wherein the loss function comprises a mean square error.

15. The method of claim 13, further comprising:
determining the model quality indicator for each parking availability correlation model based on the loss function associated with each parking availability correlation model.

16. A server comprising a controller configured to:
retrieve a plurality of parking availability correlation models, wherein each of the parking availability correlation models estimates parking availability for a target parking block comprising a plurality of parking spaces based on parking availability for one or more other parking blocks;
determine a first subset of the one or more other parking blocks for which current parking availability is known;
select a second subset of the parking availability correlation models, wherein the second subset comprises parking availability correlation models that estimate parking availability of the target parking block based on parking availability for one or more parking blocks of the first subset of the one or more other parking blocks for which current parking availability is known;
select a parking availability correlation model from the second subset based on a model quality indicator associated with each parking availability correlation model; and
estimate parking availability for the target parking block based on the selected parking availability correlation model.

17. The server of claim 16, wherein the controller is further configured to:
determine the current parking availability for the one or more other parking blocks based on sensor data received from one or more connected vehicles located in the one or more other parking blocks; and
determine that current parking availability for a parking block is known when sensor data has been received from one or more vehicles located in the parking block within a threshold time period.

18. The server of claim 16, wherein the controller is further configured to:
compile training data comprising a plurality of training examples, wherein each training example comprises parking availability of the target parking block and parking availability of one or more other parking blocks at a certain time; and
train each of the parking availability correlation model using the training data.

19. The server of claim 18, wherein the controller is further configured to:
train each of the parking availability correlation models as a linear regression model by selecting linear regression parameters such that a loss function is minimized, wherein the loss function is based on an error rate between the estimated parking availability for the target parking block and the actual parking availability for the target parking block.

20. The server of claim 19, wherein the controller is further configured to:
determine the model quality indicator for each parking availability correlation model based on the loss function associated with each parking availability correlation model.

* * * * *

UNITED STATES PATENT AND TRADEMARK OFFICE
CERTIFICATE OF CORRECTION

| | |
|---|---|
| PATENT NO. | : 11,741,836 B2 |
| APPLICATION NO. | : 17/169144 |
| DATED | : August 29, 2023 |
| INVENTOR(S) | : Takamasa Higuchi and Kentaro Oguchi |

It is certified that error appears in the above-identified patent and that said Letters Patent is hereby corrected as shown below:

On the Title Page

In page 2, Column 2, item (56), other publications, cite no. 1, delete "Transportaion" and insert --Transportation--, therefor.

Signed and Sealed this
Seventeenth Day of October, 2023

Katherine Kelly Vidal
*Director of the United States Patent and Trademark Office*